United States Patent [19]

Buttner

[11] 4,429,886

[45] Feb. 7, 1984

[54] FLEXIBLE PIPE GASKET

[75] Inventor: Robert C. Buttner, Syracuse, N.Y.

[73] Assignee: Concrete Pipe & Products Corp., East Syracuse, N.Y.

[21] Appl. No.: 426,928

[22] Filed: Sep. 29, 1982

[51] Int. Cl.³ .............................................. F16S 15/32
[52] U.S. Cl. .................. 277/207 A; 277/228
[58] Field of Search ................. 277/207–211, 277/228, 229, 166

[56] References Cited

U.S. PATENT DOCUMENTS

| 2,205,910 | 6/1940 | Raybould | 277/228 |
| 2,809,060 | 10/1957 | Thompson | 277/166 |
| 4,128,251 | 12/1978 | Gaither et al. | 277/228 |

FOREIGN PATENT DOCUMENTS 1248392 8/1967 Fed. Rep. of Germany ... 277/207 A

*Primary Examiner*—Robert I. Smith
*Attorney, Agent, or Firm*—Bruns & Jenney

[57] ABSTRACT

A flexible gasket for sealing a concrete pipe within a hole formed in a concrete wall. The gasket contains a body ring having sufficient mass to support the gasket within the hole without sagging and a resiliency to allow the gasket to be collapsed inwardly upon itself whereby the gasket is passed easily into and out of the hole. The gasket further contains a finned section mounted inside the ring having circular fins that are disposed inwardly toward the center of the gasket. A series of fins increase in length from the front end of the gasket toward the back end thereof and are adapted to contact the outer surface of a pipe inserted into the gasket opening to compress the gasket in stages against the inside surface of the hole.

8 Claims, 5 Drawing Figures

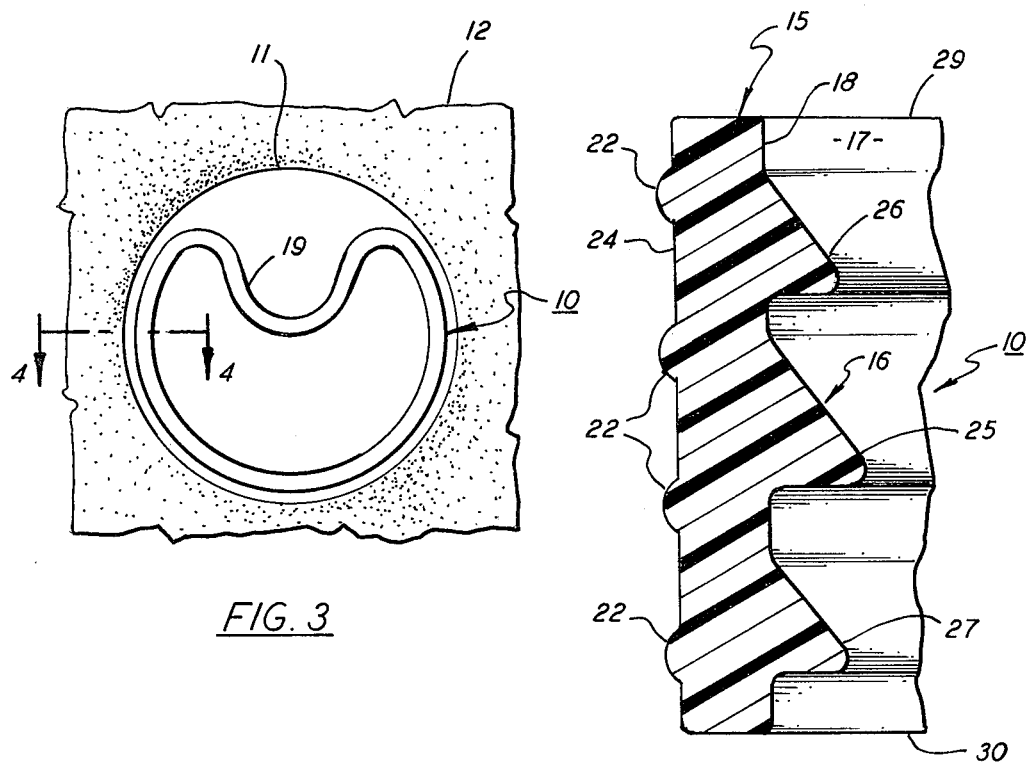
FIG. 3
FIG. 4
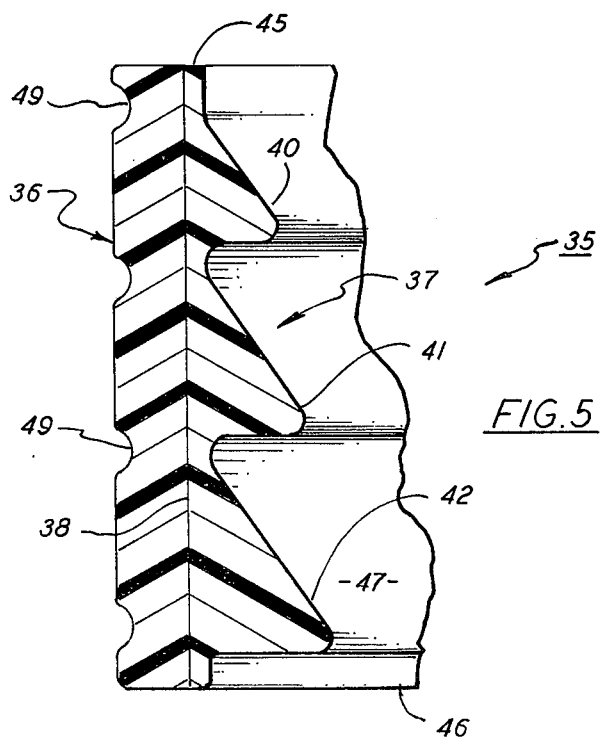
FIG. 5

FLEXIBLE PIPE GASKET

BACKGROUND OF THE INVENTION

This invention relates to a flexible pipe gasket and, in particular, to a flexible gasket that is ideally suited to form a fluid tight seal between a pipe section and a wall opening into which the pipe section is fitted.

In U.S. Pat. No. 3,787,061 an elastomeric pipe gasket is disclosed for sealing a pipe section within a receiving hole contained in a manhole riser. A circular retaining groove that compliments the outer periphery of the gasket is machined or otherwise formed in the pipe receiving hole of the riser wall and the gasket is seated therein. A wound spring is contained within the gasket which is designed to lock the gasket against the outside of the pipe. The ends of the spring are brought out of the gasket and are positioned within an expanded chamber formed in the riser wall. During assembly, the spring ends are engaged by a special tool that expands the spring sufficiently to permit the pipe to be inserted into the gasket. When the spring is then released it tightens the gasket against the pipe thereby completing the sealing joint. It should be noted, however, that the gasket may be pinched or rolled against the sharp edges of the retaining groove during pipe insertion and becomes torn or otherwise damaged. Expansion of the spring within the limited confines of the pipe receiving hole is oftentimes difficult to achieve. The exposed ends of the spring are susceptible to corrosion which leads to premature failure of the seal.

In U.S. Pat. No. 3,958,313, a funnel-shaped boot is disclosed that is used to join a pipe section to a manhole riser. The neck of the boot is clamped by a metal collar to the pipe section and the wide end of the boot is passed into a hole formed in the riser wall. The boot is locked within the hole by means of a special expansion band having a toggle joint which, when actuated, expands the wide end of the boot into sealing contact against the sidewall of the hole. The toggle is joined to the two ends of the band and normally holds the band in a contracted condition. To expand the band, a closing force of about 1000 pounds is exerted by a pneumatic tool directly against the toggle joint. The high pressure not only closes the joint but also destroys the toggle. Accordingly, if a fluid tight seal is not achieved on the first closure attempt, the pipe must be removed from the hole and fitted with a new sealing gasket. By the same token, if the seal must be broken for maintenance purposes or the like, the entire gasket unit must be removed and a new toggle joint expansion band inserted in the boot. Boot type seals because they protrude beyond the wall opening, the highly susceptible to being cut on the sharp front edge of the wall. Sharp rocks, tools or other types of foreign objects can also easily penetrate the exposed section of the boot during back filling or excavating operations. Lastly, it should be noted that the expandable band of the unit is continually exposed to moisture and/or other corrosive fluids carried by the system and, unless fabricated of special high priced corrosion resistant materials, will fail long before the other component parts that form the sealing joint.

SUMMARY OF THE INVENTION

It is therefore an object of the present invention to improve flexible pipe seals.

A further object of the present invention is to provide a flexible gasket for sealing a concrete pipe within a receiving hole formed in a concrete wall that does not require special preparation of either the pipe or the wall opening.

A still further object of the present invention is to provide a gasket for sealing a pipe within a receiving hole which is flexible enough to permit the pipe to be realigned in the hole without breaking the seal.

Another object of the present invention is to provide a flexible pipe gasket that is compressed against the wall of a receiving hole in increasing stages as the pipe is passed into the gasket.

Yet another object of the present invention is to provide a resilient circular pipe gasket that has sufficient mass to permit the gasket to stand without support in a pipe receiving hole and a thickness to length ratio that is large enough to prevent the gasket rolling under as a pipe is inserted therein.

A still further object of the present invention is to provide a flexible pipe gasket that can be reused a number of times without degrading the sealing properties of the gasket.

These and other objects of the present invention are attained by means of a circular pipe gasket for sealing a pipe within a receiving hole formed in a wall or the like. The gasket includes an outer resilient ring having sufficient mass to enble the gasket to stand in a circular condition within the receiving hole and a length to thickness ratio that is great enough to prevent the gasket from being rolled back or otherwise displaced in the hole as a pipe is inserted therein, and an inner finned section also formed of a resilient material having a series of inwardly directed circular fins that embrace the pipe and thus cause the gasket to be compressed between the pipe and the wall of the receiving hole. The finned section also provides additional mass and rigidity to further aid in holding the gasket in a circular condition within the receiving hole. The inside diameter described by at least the first two fins in the series progressively decreases in size from the front of the gasket toward the back whereby the gasket is compressed in increasing stages as the pipe moves into the gasket opening.

BRIEF DESCRIPTION OF THE DRAWINGS

For a better understanding of these and other objects of the invention, reference is had to the following detailed description of the invention which is to be read in conjunction with the associated drawings, wherein:

FIG. 3 is a front view of the pipe receiving hole formed in the wall of the manhole riser showing the gasket mounted in the hole in a collapsed condition;

FIG. 4 is an enlarged section taken along lines 4—4 in FIG. 3; and

FIG. 5 is an enlarged partial section showing another embodiment of a gasket embodying the teachings of the present invention which is formed in two sections.

DESCRIPTION OF THE INVENTION

Figure 1:
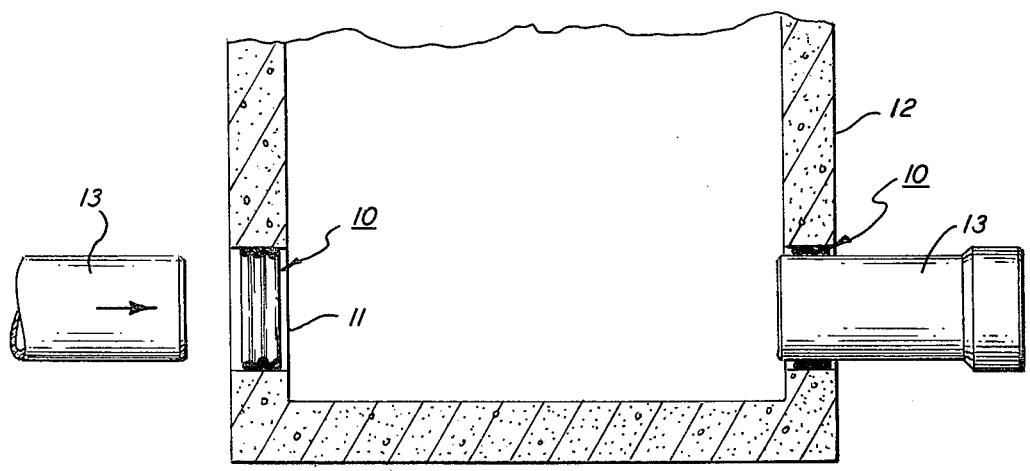
FIG. 1 is a side elevation of a manhole riser showing a gasket embodying the teaching of the present invention mounted in a receiving hole.
Figure 2:
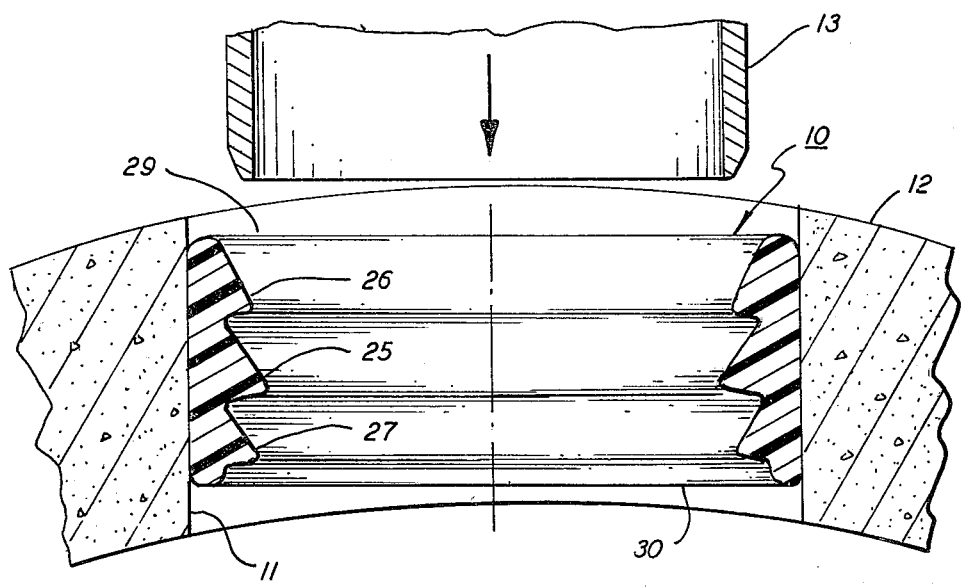
FIG. 2 is an enlarged partial top plan view in section showing the gasket illustrated in FIG. 1 mounted in the hole.

Turning initially to FIGS. 1-4, wherein like component parts are identified by like numerals, there is shown an annular pipe gasket, generally referenced 10, which embodies the teachings of the present invention. In this particular embodiment of the invention, the gasket is formed of a rubber-like material capable of forming a fluid tight seal between a concrete sewer pipe section 13 and the inner wall of a pipe receiving opening 11 formed in a concrete manhole riser 12, or the like. As best seen in FIGS. 1 and 2, in assembly the gasket is contained within a hole that has been cast or otherwise formed in the manhole riser. As will become evident from the disclosure below, the present gasket, because of its unique construction, can be easily inserted into the opening and snapped into place to provide a self-supporting structure that locks itself against the inner wall of the hole and resists axial movement as a pipe is passed therein. It should also be noted that the gasket can be easily removed from assembly without the need of special tools and without destroying the sealing properties of the device. Accordingly, the gasket may be reused a number of times before it has to be replaced.

Gasket 10 includes an outer body ring 15 and an inner finned section 16. In this embodiment of the invention, the body ring and the finned section are both cast in one piece from natural or synthetic rubber having a hardness of between 40 and 60 durometers. The gasket contains a central opening 17 for slidably receiving a pipe 13 therein. The inside wall of opening 17 has a diameter that is slightly larger than the outside diameter of the pipe. The outer periphery of the gasket is made equal to or slightly larger than the diameter of the receiving hole formed in the riser wall.

To mount the gasket in the riser hole, the gasket is initially collapsed inwardly upon itself as shown in FIG. 3. This is accomplished by applying sufficient downward pressure on one quadrant of the gasket to cause the gasket to fold inwardly upon itself. A U-shaped indentation 19 is thus produced in the circular structure thus reducing the outer peripheral size of the gasket. Accordingly, the collapsed gasket is easily inserted into the receiving hole and positioned axially at a desired location. Once located, the gasket is snapped back into its normal circular posture to lock the outer surface of the gasket in contact against the inner wall of the hole. It is important that the gasket have sufficient mass so that when it is snapped in place it will continue to exert a holding force against the wall of the hole. Preferably about 1/16 of an inch interference is provided between the gasket and the wall to insure that the gasket exerts a uniform pressure against the wall about its entire periphery.

The outer surface of the gasket is provided with a series of spaced apart raised circular ribs 22—22. The ribs are an integral part of the gasket body ring. When the gasket is snapped into place within the hole, the ribs are compressed or deformed against the inside wall of the hole thus allowing the resilient gasket to automatically compensate for irregularities in the hole surface and also provide added holding power thereagainst.

Inwardly disposed circular fins protrude into the central opening 17 of the gasket from the inside wall 18 of the body ring. In the main embodiment of the invention as illustrated in FIGS. 1-4, three fins are employed which include a central fin 25 and two outer fins 26 and 27 that are equally spaced to either side of the central fin. As best seen in FIG. 4, the radial length of the central fin is greater than that of the two outer fins. In all cases, however, the circular opening provided by each of the three fins is less than the outside diameter of the pipe section to be received therein so that the fins embrace the pipe in a collet-like manner to axially align the pipe in the hole.

The fins are obliquely positioned within the gasket opening 17 so that each fin slants from the front end face 29 of the gasket towards rear end face 30. The fins thus all deflect in the direction of pipe movement as the pipe section is inserted into the gasket opening. This, in turn, eliminates the tendency for the gasket to twist or roll back as the pipe moves axially through the opening. The radial length of the first two fins increases progressively from front to rear. This causes the gasket to be progressively loaded in compression between the pipe and the manhole opening as the pipe passes into the gasket. As the pipe enters the seal, it initially comes into contact with the outermost fin 26 compressing the gasket sufficiently to lock the gasket in the opening thus permitting the pipe to be pushed further into the gasket without displacing the gasket in the hole. As the pipe is moved past the second or longer fin 25, the gasket is further compressed against the wall of the hole to effect highly reliable fluid tight seal between the gasket and the pipe. The radial length of the last fin 27 in the series is about equal to that of the first fin so that the gasket is uniformly loaded to either side of the central fin. The axial spacing of the fins is such that the entire gasket is placed in compression when the gasket is mounted in a sealing condition between the pipe and the riser. Compressing the entire gasket in this manner prevents deterioration of the rubber.

In practice, the axial length of the seal is less than that of the receiving opening so that the gasket is able to make full peripheral contact with the riser wall when it is snapped in place. This prevents the gasket from being exposed to the sharp corners at the hole openings or from coming into contact with foreign objects. To prevent the gasket from axially shifting or rolling under as the pipe is being inserted therein, it is preferred that the axial length of the body ring be about eight times its cross-sectional thickness. Pipe sections have been driven into gaskets of the type herein described by first lubricating the outside of the pipe and then using power equipment to drive the pipe in without adversely affecting the gasket or displacing it from its seated position within the riser opening. To remove the gasket from the opening, the pipe is usually lubricated and withdrawn from the gasket opening. The gasket is then collapsed in the opening using a pry bar or the like and withdrawn from the hole. As can be seen, because of the simple manner in which the gasket is mounted in assembly and the progressive loading technique used to develop the fluid tight seal, assembling and removing the seal can be accomplished without harming the gasket. The gasket thus can be reused a number of times which results in a considerable saving.

Turning now to FIG. 5, there is shown a gasket 35 embodying another form of the invention. The gasket consists of an outer body ring 36 and an inner finned section 37. The finned section is formed of a soft 40 durometer elastomer capable of providing a good seal against the pipe. The body ring on the other hand is made of a more rigid 60 durometer elastomer that is capable of being securely locked against the wall of the receiving hole. During manufacture, two materials are extruded against each other using a well known dual durometer extrusion technique to establish an inextricable joint along contact line 38. In this embodiment of the invention, the radial depth of the three fins 40-42 progress in equal increments from the front face 45 of the gasket toward the rear face 46 thereof. Accordingly, the gasket is loaded in three separate stages as the pipe passes through the gasket opening 47. This three step loading procedure first locks the gasket in the hole and then allows for higher compressive forces to be attained without disturbing or otherwise harming the gasket. A series of equally spaced circular grooves 49—49 are formed in the outer periphery of the body ring. The grooves provide space along the axial length of the gasket into which the elastomeric material is deformed as it is being compressed under a relatively heavy load between the pipe and the wall of the receiving hole.

While this invention has been described with reference to the details as set forth above, it is not limited to the specific structure as disclosed and the invention is intended to cover any modifications or changes as may come within the scope of the following claims.

I claim:

1. A resilient gasket for providing a fluid tight seal between a concrete pipe and the wall of a circular receiving hole formed in a second concrete member, said gasket including
   an outer ring having a smooth outside diameter that is at least as large as the diameter of the receiving opening and an inside diameter that is greater than the pipe diameter, said ring being formed of a resilient material having a mass that is sufficient to support the ring in a circular condition within the hole and apply a deforming pressure to compress the ring against the wall of the hole about the entire periphery thereof, the resiliency of said ring being such as to permit the ring to be collapsed inwardly upon itself so that it may be inserted and removed from the hole, and
   an inner finned section axially aligned within the ring having a plurality of axially spaced circular fins disposed inwardly into a central opening, each fin having an inside diameter that is less than said outside diameter of the pipe, said fins also being formed of a resilient material so that added sealing pressure is applied to the ring when the pipe is passed into the opening.

2. The gasket of claim 1 wherein the ring is formed of a higher durometer material than the finned section.

3. The gasket of claim 1 wherein the axial length of the ring is about eight times its cross-sectional width.

4. The gasket of claim 1 wherein the outer surface of the ring contains a series of axial spaced grooves into which the ring deforms as it is compressed against the wall.

5. The gasket of claim 1 wherein the fins are obliquely positioned in assembly so that the fins slope from the pipe entrance side of the ring towards the back of the ring and the inside diameter of the fins decrease progressively in size from the pipe entrance side of the ring toward the back thereof.

6. The gasket of claim 1 wherein the body ring and the finned section are formed as a single unit of the same material.

7. The gasket of claim 1 wherein the outside surface of the body ring contains a series of raised axial space ribs that are compressed against the inside wall of the hole.

8. The gasket of claim 1 wherein the finned section contains a large central fin and two smaller fins axially spaced on either side of the central fin.

* * * * *